Patented Aug. 8, 1944

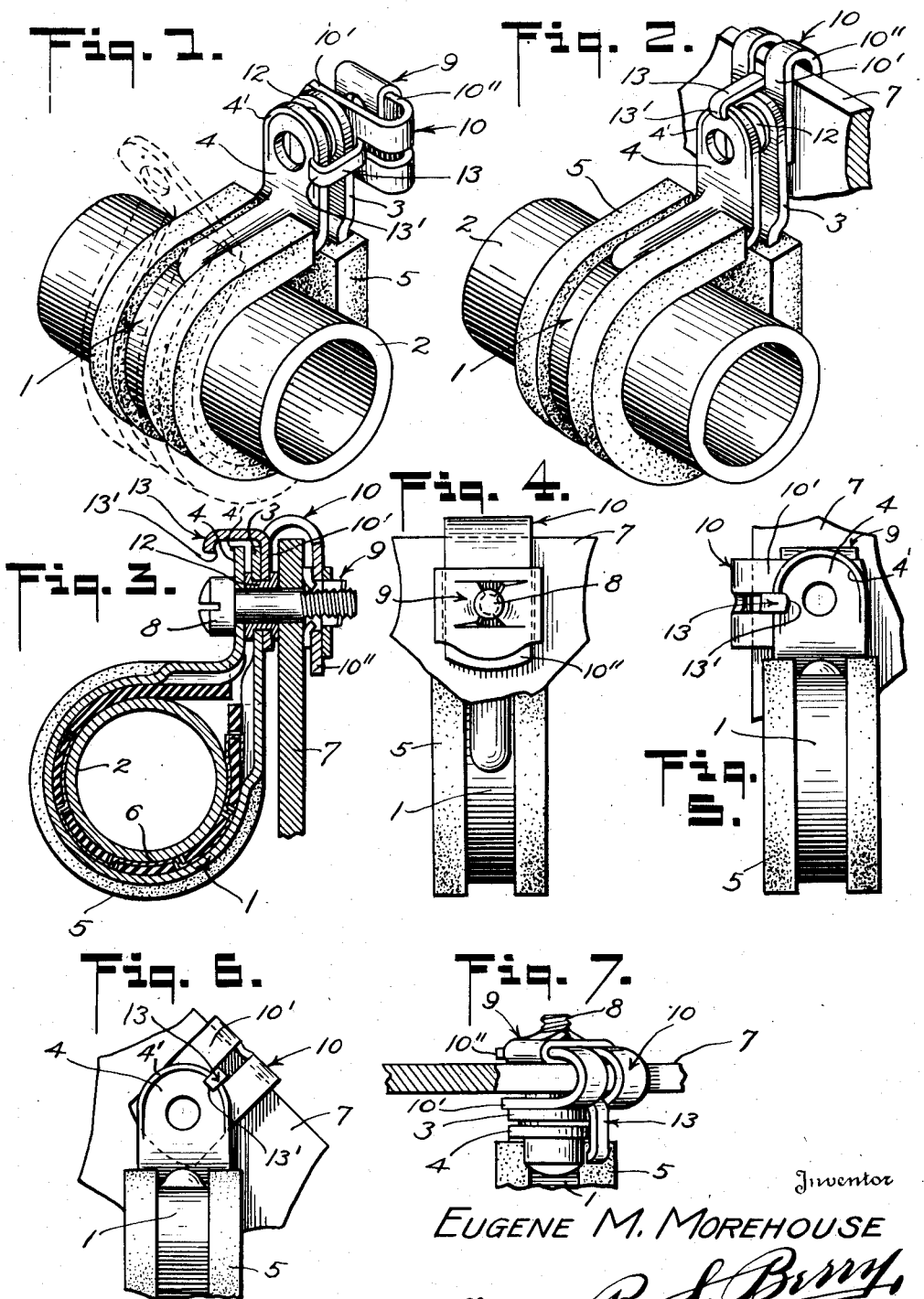

2,355,096

UNITED STATES PATENT OFFICE 2,355,096

CONDUIT SUPPORTING CLIP

Eugene M. Morehouse, Tujunga, Calif., assignor to Adel Precision Products Corp., a corporation of California Application February 15, 1943, Serial No. 476,003

9 Claims. (Cl. 248—74)

This invention relates to clips for supporting the fluid conducting and other conduit lines in aircraft, wherein the clips are provided with clasps for temporarily holding them on a structural part of the aircraft in position to be readily and easily secured thereto, and provision is also made for temporarily holding the clips in the desired position on the conduit until said clips are completely installed.

In my pending application for patent entitled "Supporting clip for conduits," Ser. No. 464,276, filed November 2, 1942, there is shown a clip of the character above described, wherein a latch member or hook is struck out from one of the two opposed ends of the conduit embracing strap for temporarily securing the two ends in position to hold the clip on the conduit, and a clasp is formed integrally with said one end for temporarily holding the strap on the structural part to which it is to be secured.

In another of my pending applications entitled "Conduit clip and supporting bracket," Ser. No. 463,287, filed October 24, 1942, there is also shown a similar clip wherein one of the two opposed ends of the conduit-embracing strap has a separate clasp pivoted thereto so that it may be moved into various positions for a more convenient temporary mounting of the clip on a structural member to which the clip is to be secured, there being, however, no latch or hook in association with the clasp or strap for holding the ends of the strap so as to temporarily mount it on the conduit.

The present invention has for its primary object to provide a conduit clip which is similar to those hereinbefore described but subject to being much more readily and easily installed with a saving in time, labor, and costs, in that a temporary holding latch or hook member is provided on the separate strap-carried clasp itself rather than being struck out from or otherwise formed on one of the ends of the strap, and is at all times disposed so that when the two ends of the strap are brought into predetermined position the hook will hold them together to maintain the strap in the desired position on the conduit, in both sub-assembly and direct installation operations.

Another object is to provide a conduit clip of the character described wherein the separate clasp on which the latching hook is formed is adjustably supported on one of the ends of the strap as by being pivoted thereto, the latching hook in the present case being so formed and disposed with relation to the ends of the strap that regardless of the adjusted position of the clasp it will latch said ends together when they are moved toward one another into a predetermined position in which the strap is clamped on the conduit.

A further object is to provide a conduit clip such as described in which the clasp pivoted on one end of the conduit-supporting strap supports a nut as well as the latching hook, with the nut in position to be threadedly engaged with a bolt when the latter is inserted through the ends of the strap, the structural part of the aircraft and said clasp.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention showing how the clip is positioned on a conduit in preparation for temporarily clamping and holding it thereon;

Fig. 2 is a perspective view of the clip after being temporarily clamped on the conduit, showing the clip temporarily held on a structural part of an aircraft by means of the clasp;

Fig. 3 is a vertical sectional view of the clip as when completely installed;

Fig. 4 is a fragmentary enlarged rear elevation of the clasp and adjacent parts of the clip;

Fig. 5 is a front elevation with the clasp extending in the opposite direction from that shown in Fig. 1;

Fig. 6 is a fragmentary front elevation showing the clasp adjusted to embrace an inclined edge of a structural member;

Fig. 7 is a fragmentary plan view of the arrangement shown in Fig. 6 as finally installed.

Referring to the drawing more specifically, it is seen that a conduit supporting clip embodying my invention includes a tensioned metallic strap I adapted to embrace a conduit 2, and provided with opposed apertured ends 3 and 4 normally spaced apart and subject to being moved towards one another to clamp the strap on the conduit.

As here shown the strap I is provided with a cushion strip 5 of compressible insulation material affording a cushioned seat for the conduit, there being an electrically conductive bonding strip 6 arranged relative to the strap and the cushion for contacting the conduit to bond the latter to the metal strap for the purpose of harmlessly and without radio interference discharging static electricity into a metal structural member 7 of the airplane, to which member the ends of the strap are secured by a bolt 8 and a nut 9.

In accordance with this invention a separate U-shaped metal clasp 10 having apertured opposed legs 10' and 10" is mounted on one of the ends, for example, the end 3 of the strap 1, for embracing an edge portion of the structural member 7 of the aircraft to hold the clip temporarily in position to be secured to said member by means of the bolt 8 and nut 9. As here shown the clasp 10 is pivoted on the end 3 by means of a hollow or tubular rivet 12 passing through the apertures in the leg 10' and end 3, whereby the clasp may be swung through at least 180° of arc for application of the clasp to variously positioned edges of structural parts of the aircraft, whether said edges extend horizontally, vertically or at various angles.

The nut 9 is clipped around and thus permanently mounted on the leg 10" of the clasp 10 so that when the bolt 8 is inserted in place and turned it will thread into the nut thereby making it unnecessary to handle the nut in the operation of completing the installation of the clip.

In order to hold the ends 3 and 4 of the strap in a position for temporarily clamping the clip on the conduit either before or after the clasp is mounted on the structural member 7, I provide on the clasp 10 a hook member 13 which is struck out from the leg 10' and the mid portion of the clasp. This hook extends substantially at right angles to the end 3 toward the end 4 and is on a line with the longitudinal center line of the clasp and positioned close to the curved edge of the end 3 of the strap so that when the clasp is swung on its pivot the hook will traverse an arcuate path concentric with said edge. The end 4 is correspondingly curved and is beaded or ribbed at the arcuate edge 4', the bead or rib insuring a good grip of the hook. The slightly inturned bill portion 13' of the hook is disposed so that when the end 4 is moved toward the end 3 into a predetermined position the beaded or ribbed edge 4' will snap or may be moved past the bill 13' and become latched thereto, thereby holding the clip on the conduit. The ends 3 and 4 when thus held by the hook 13 have their apertures aligned so that the bolt 8 may be readily inserted and turned into the nut 9.

It is seen that the hook 13 is disposed in all positions of the clasp so that the end 4 may be held thereby in position to clamp the clip on the conduit.

As the strap 1 is tensioned, the ends 3 and 4 tend to spring when the end 4 is released after it is moved past the bill 13' of the hook 13, thereby causing end 4 to spring outwardly into tensioned engagement with the hook and be held in position clamping the strap on the conduit. With the strap thus held the mounting of the clasp on the aircraft may be readily and easily effected or if the clasp is already mounted, the insertion of the bolt and the final installation operation of tightening the clip on the conduit and bolting it to the structural member 7 may be easily and readily carried out.

It should be noted that after the ends are temporarily held together by the hook 13 on the clasp 10, and before the clasp is mounted on the structural member of the aircraft, said clasp may be swung on its pivot into the desired position throughout at least 180° of arc without releasing the hook.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting a conduit in aircraft, a conduit-embracing strap having opposed ends adapted to be moved into a predetermined position to clamp the strap on the conduit, a clasp mounted on one of said ends for embracing a structural part of the aircraft to support the strap thereon, and a latch hook on said clasp for engaging and holding the other of said ends to hold said ends in said predetermined position.

2. In a clip for supporting a conduit in aircraft, a conduit-embracing strap having opposed ends adapted to be moved into a predetermined position to clamp the strap on the conduit, a clasp adjustably mounted on one of said ends for movement into different positions best suited for embracing a structural part of the aircraft to support the strap thereon, and a latch hook carried by said clasp for engaging the other of said ends to hold said ends in said predetermined position.

3. In a clip for supporting a conduit in aircraft, a conduit-embracing strap having opposed ends adapted to be moved into a predetermined position to clamp the strap on the conduit, a clasp pivoted on one of said ends and adapted to embrace a structural part of an aircraft to support the strap thereon, and a latch hook arranged on said pivoted clasp for engaging the other of said ends and holding the ends in said predetermined position.

4. In a clip for supporting a conduit in aircraft, a conduit-embracing strap having opposed ends adapted to be moved into a predetermined position to clamp the strap on the conduit, a clasp pivoted on one of said ends and adapted to embrace a structural part of an aircraft to support the strap thereon, a latch hook arranged on said pivoted clasp for engaging the other of said ends and holding the ends in said predetermined position, and a fastening inserted through said ends and said clasp for securing the strap to said structural part.

5. In a clip for supporting a conduit in aircraft, a conduit-embracing strap having opposed ends adapted to be moved into a predetermined position to clamp the strap on the conduit, a clasp mounted on one of said ends for embracing a structural part of the aircraft to support the strap thereon, a latch hook on said clasp for engaging and holding the other of said ends to hold said ends in said predetermined position, a nut fixed on said clasp, and a threaded fastening inserted through said ends and threaded into said nut.

6. In a clip for supporting a conduit in aircraft, a conduit-embracing strap having opposed ends adapted to be moved into a predetermined position to clamp the strap on the conduit, a substantially U-shaped clasp adapted to embrace an edge of a structural part of the aircraft, a tubular rivet pivotally connecting one leg of the clasp with one end of the strap, a nut fixed on the other leg of said clasp in alignment with the bore of said rivet, a hook carried by said one leg of said clasp and extending beyond said one end of the strap for engaging the other end of the strap to hold said ends in a predetermined position in which the strap is clamped on the conduit, said ends of the strap and said legs having apertures which align with one another and the bores through said nut and said rivet when said ends are held by said hook, and a threaded fastening inserted through said apertures and bores for securing the clip to said structural part.

7. In a clip for supporting a conduit in aircraft, a conduit-embracing strap having opposed arcuate ends adapted to be moved into a predetermined position to clamp the strap on the conduit, a clasp pivoted on one of said ends and adapted to embrace a structural part of an aircraft to support the strap thereon, and a latch hook arranged on said pivoted clasp for adjustment along an arcuate path for engaging different parts of the other of said ends and holding the ends in said predetermined position while said clasp is stationary and during the adjustment of the clasp on its pivot.

8. In a clip for supporting a conduit in aircraft, a conduit-embracing strap having opposed ends adapted to be moved into a predetermined position to clamp the strap on the conduit, a clasp pivoted on one of said ends and adapted to embrace a structural part of an aircraft to support the strap thereon, a latch hook arranged on said pivoted clasp for engaging the other of said ends and holding the ends in said predetermined position, and a ribbed edge on said other end adapted to hold the hook thereon when the clasp is at rest and while the clasp is being adjusted.

9. In a clip for supporting a conduit in aircraft, a conduit-embracing strap having opposed ends adapted to be moved into a predetermined position to clamp the strap on the conduit, a clasp pivoted on one of said ends and adapted to embrace a structural part of an aircraft to support the strap thereon, a latch hook arranged on said pivoted clasp for engaging the other of said ends and holding the ends in said predetermined position, and cooperating members on said hook and said other end for holding the hook on the latter during adjustment of the hook.

EUGENE M. MOREHOUSE.